United States Patent
Matsuzaki

(10) Patent No.: US 10,390,473 B2
(45) Date of Patent: Aug. 27, 2019

(54) WORK VEHICLE AND METHOD FOR CONTROLLING WORK VEHICLE

(71) Applicant: Kubota Corporation, Osaka-shi (JP)

(72) Inventor: Yushi Matsuzaki, Sakai (JP)

(73) Assignee: KUBOTA CORPORATION, Osaka-Shi (JP)

(*) Notice: Subject to any disclaimer, the term of this patent is extended or adjusted under 35 U.S.C. 154(b) by 44 days.

(21) Appl. No.: 15/624,718

(22) Filed: Jun. 16, 2017

(65) Prior Publication Data

US 2018/0168093 A1 Jun. 21, 2018

(30) Foreign Application Priority Data

Dec. 20, 2016 (JP) .................................. 2016-246759

(51) Int. Cl.
*A01B 69/04* (2006.01)
*G05D 1/02* (2006.01)
(Continued)

(52) U.S. Cl.
CPC ............ *A01B 69/008* (2013.01); *A01B 69/00* (2013.01); *G05D 1/0278* (2013.01);
(Continued)

(58) Field of Classification Search
CPC .... A01B 69/00; G05D 1/0278; G05D 1/0287; G05D 2201/0201; G06F 3/147
See application file for complete search history.

(56) References Cited

U.S. PATENT DOCUMENTS 5,638,280 A * 6/1997 Nishimura ......... G01C 21/3446
340/990
5,890,134 A * 3/1999 Fox ........................ G06Q 10/06
700/100

(Continued)

FOREIGN PATENT DOCUMENTS

JP 2000-14208 1/2000
JP 2014-138570 7/2014
(Continued)

OTHER PUBLICATIONS

Deere & Company, "Greenstar(TM) 3 2630 Display Operator's Manual GreenStar(TM) 3 2630 Display John Deere Ag Management Solutions", Dec. 31, 2013, XP055423429.
(Continued)

*Primary Examiner* — Calvin Cheung
(74) *Attorney, Agent, or Firm* — Mori & Ward, LLP

(57) ABSTRACT

A work vehicle includes a memory and circuitry. The memory is to store a travel route and work action information based on which the work vehicle is to execute at least one work action while the work vehicle travels based on the travel route. The circuitry is configured to calculate a position of the work vehicle based on positioning data transmitted from a satellite positioning module. The circuitry is configured to control the work vehicle to execute the at least one work action based on the work action information in accordance with the position of the work vehicle while the work vehicle travels based on the travel route stored in the memory. The circuitry is configured to generate screen data to chronologically display the at least one work action in a monitor.

11 Claims, 8 Drawing Sheets

(51) Int. Cl.
*A01B 69/00* (2006.01)
*G06F 3/147* (2006.01)

(52) U.S. Cl.
CPC .......... *G05D 1/0287* (2013.01); *G06F 3/147* (2013.01); *G05D 2201/0201* (2013.01); *G09G 2380/10* (2013.01)

(56) References Cited

U.S. PATENT DOCUMENTS

| | | | | |
|---|---|---|---|---|
| 8,522,240 | B1* | 8/2013 | Merwarth | G06Q 10/0631 |
| | | | | 705/26.82 |
| 2004/0117046 | A1* | 6/2004 | Colle | G06Q 10/06 |
| | | | | 700/99 |
| 2008/0249692 | A1* | 10/2008 | Dix | A01B 69/008 |
| | | | | 701/50 |
| 2015/0179000 | A1* | 6/2015 | Jayanthi | G01C 21/26 |
| | | | | 701/32.4 |
| 2016/0104113 | A1* | 4/2016 | Gorlin | G06Q 10/08355 |
| | | | | 705/338 |

FOREIGN PATENT DOCUMENTS

| | | |
|---|---|---|
| JP | 2016-034238 | 3/2016 |
| WO | WO 2014/151453 | 9/2014 |

OTHER PUBLICATIONS

Deere & Company, "John Deere Precision Ag Technology", Oct. 31, 2015, XP055423180.
GOLDMANEQUIPMENT1, "Loading a Map Based RX File.mp4", You Tube, Feb. 23, 2013, pp. 1-2, XP054977869.
Extended European Search Report for corresponding EP Application No. 17000975.7-1802, dated Nov. 20, 2017.

* cited by examiner

WORK VEHICLE AND METHOD FOR CONTROLLING WORK VEHICLE

CROSS-REFERENCE TO RELATED APPLICATIONS

The present application claims priority under 35 U.S.C. § 119 to Japanese Patent Application No. 2016-246759, filed Dec. 20, 2016. The contents of this application are incorporated herein by reference in their entirety.

BACKGROUND OF THE INVENTION

Field of the Invention

The present invention relates to a work vehicle and a method for controlling a work vehicle.

Discussion of the Background

Japanese Patent Application Laid-open No. 2014-138570 discloses an agricultural work machine configured to operate in various work modes. This agricultural work machine is configured to download agricultural work information for a target agricultural work plot, compare a currently set work mode and a registered work mode included in the downloaded agricultural work information, and display a result of the comparison on a display unit.

Japanese Patent Application Laid-open No. 2016-034238 discloses a drive assist system configured to record contents of a series of operation tasks once executed during work travel, and then automatically execute the series of operation tasks by reproducing the recorded operation contents to reduce a load of a driver during the work travel. This drive assist system includes an instrument control unit configured to transmit an actuation control signal to a travel actuation instrument configured to move a travel vehicle and a work actuation instrument configured to actuate a ground work device, a recording unit configured to record control data corresponding to the actuation control signal as work travel sequences in an execution processing order, a reproduction unit configured to read the control data recorded in the recording unit and transmit the control data to the instrument control unit, a screen processing unit configured to convert the control data by execution processing units to icons and display, on a display unit, a work travel sequence screen displaying the icons in the execution processing order, and a multitask travel management unit configured to manage the plurality of work travel sequences on the identical work travel sequence screen.

SUMMARY OF THE INVENTION

According to one aspect of the present invention, a work vehicle includes a memory and circuitry. The memory is to store a travel route and work action information based on which the work vehicle is to execute at least one work action while the work vehicle travels based on the travel route. The circuitry is configured to calculate a position of the work vehicle based on positioning data transmitted from a satellite positioning module. The circuitry is configured to control the work vehicle to execute the at least one work action based on the work action information in accordance with the position of the work vehicle while the work vehicle travels based on the travel route stored in the memory. The circuitry is configured to generate screen data to chronologically display the at least one work action in a monitor.

According to another aspect of the present invention, a method for controlling a work vehicle includes calculating a position of the work vehicle based on positioning data transmitted from a satellite positioning module. The work vehicle is controlled to execute at least one work action based on work action information in accordance with the position of the work vehicle while the work vehicle travels based on a travel route. The work action information and the travel route are stored in a memory. Screen data are generated to chronologically display the at least one work action in a monitor.

According to further aspect of the present invention, a work vehicle includes storage means, calculation means, control means, and data generation means. The storage means are for storing a travel route and work action information based on which the work vehicle is to execute at least one work action while the work vehicle travels based on the travel route. The calculation means are for calculating a position of the work vehicle based on positioning data transmitted from a satellite positioning module. The control means are for controlling the work vehicle to execute the at least one work action based on the work action information in accordance with the position of the work vehicle while the work vehicle travels based on the travel route stored in the memory. The data generation means are for generating screen data to chronologically display the at least one work action in a monitor.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
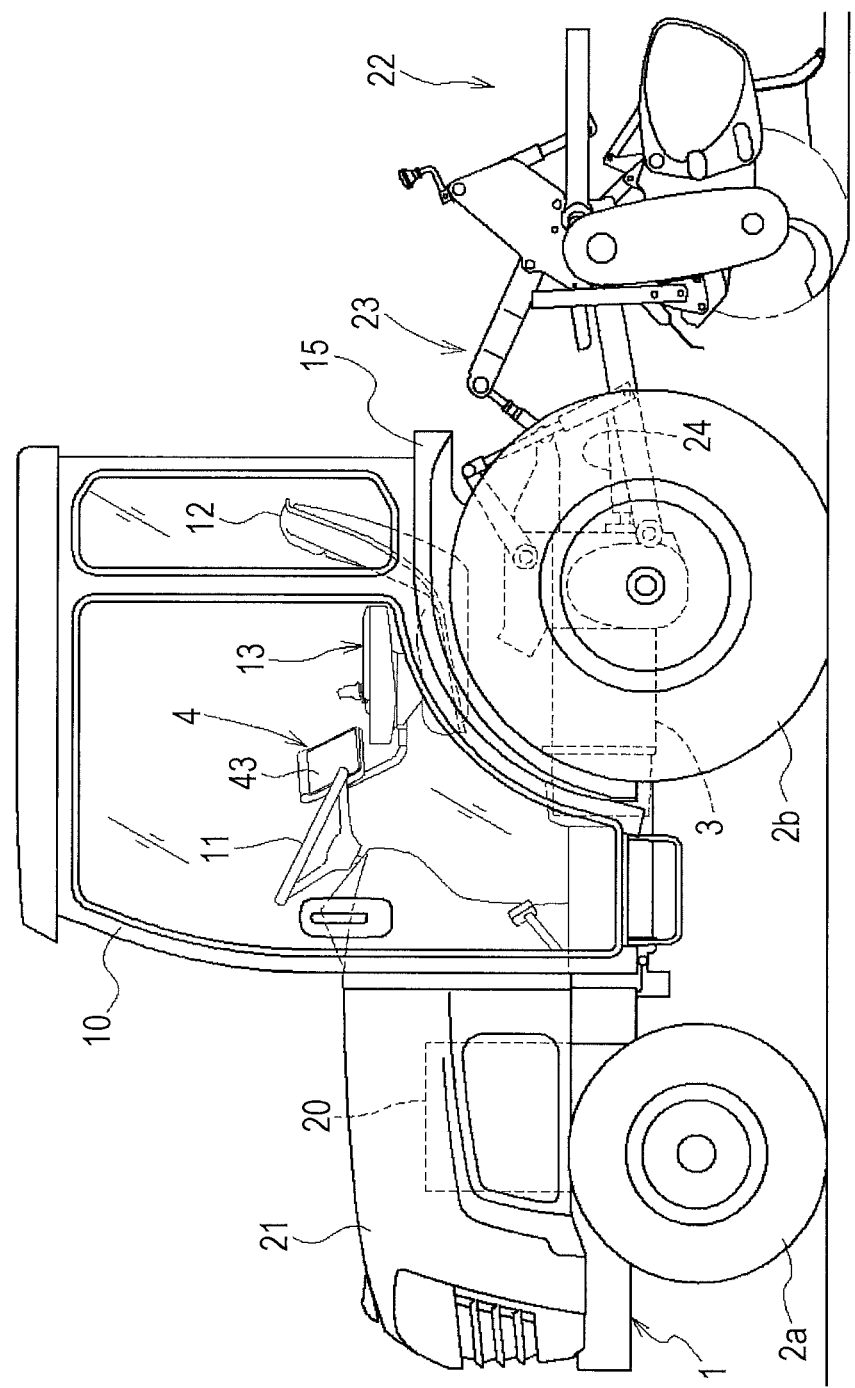
FIG. 1 is a side view of a tractor as an automatic travelling work vehicle according to an embodiment.

The embodiments will now be described with reference to the accompanying drawings, wherein like reference numerals designate corresponding or identical elements throughout the various drawings. The phrase "work travel" in the following embodiments includes a state where at least one of working while travelling, only travelling, or only working, is being executed, and a state where such travel work is temporarily stopped.

There is exemplified an agricultural work tractor as an automatic travelling work vehicle according to an embodiment of the present invention. FIG. 1 is a side view of the tractor. This tractor includes an engine 20 mounted in a front portion of a vehicle body 1 of the tractor supported by front wheels 2a and rear wheels 2b, and a transmission 3 behind the engine 20. The vehicle body 1 is provided therebehind with a vertically shiftable tilling device 22 via a lifting mechanism 23. This tractor is of a four-wheel drive type, and motive power of the engine 20 is transmitted to the front wheels 2a and the rear wheels 2b via a transmission mechanism incorporated in the transmission 3. Motive power of the engine 20 is also transmitted to the tilling device 22 via a PTO shaft 24 projecting backward from the transmission 3. The engine 20 is covered with a bonnet 21. The vehicle body 1 supports a cabin 10 disposed behind the bonnet 21 and above the transmission 3.

The cabin 10 has an interior serving as a driving space, a front portion of which is provided with a steering wheel 11 for steering operation of the front wheels 2a via a steering mechanism (not shown), and a rear portion of which is provided with a driver's seat 12 interposed between a pair of left and right rear wheel fenders 15. The driver's seat 12 is provided with an armrest operation device 13 extending from a lateral position to a front position of the driver's seat and having various operation tools. The armrest operation device 13 is provided thereahead with a data processing terminal having an input-output function and functioning as a first control unit 4. This data processing terminal (first control unit 4) includes a touch panel 43 configured to receive various operation inputs by a driver and notify the driver of various information.

Although not shown, the armrest operation device 13 is provided with an operation lever configured to vertically shift the tilling device 22 via the lifting mechanism 23, a gear shift lever configured to switch variable speed levels of the transmission 3, a driving mode switch lever configured to switch between 4WD and 2WD, an engine rotational speed adjust lever configured to adjust engine rotational speed, and the like.

Figure 2:
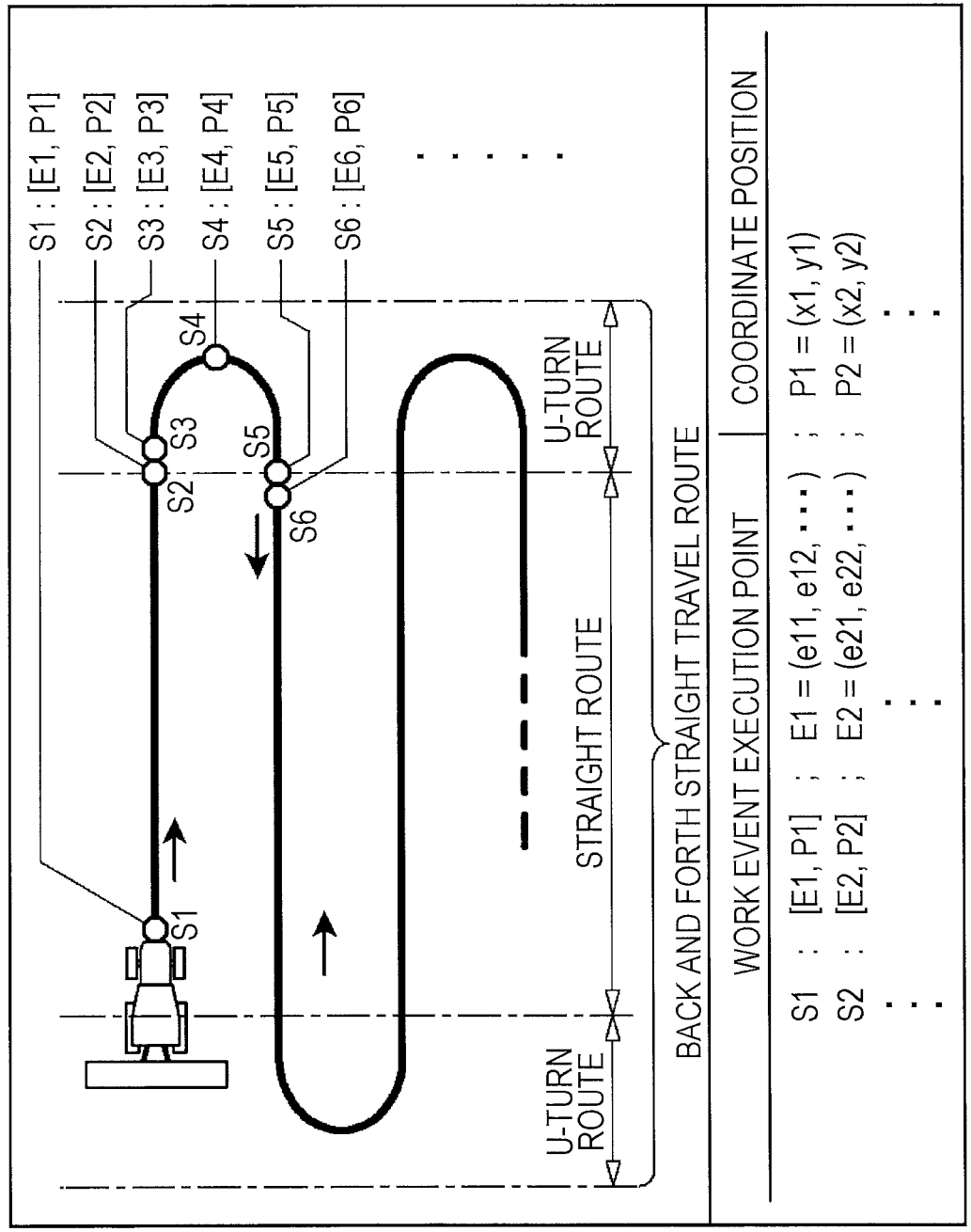
FIG. 2 is an explanatory view of a travel route and work events allocated on the travel route.

FIG. 2 schematically shows exemplary work travel of the tractor. The tractor in this example automatically travels on a travel route including a plurality of straight routes and U-turn routes connecting the straight routes to configure a back and forth straight travel route. During travel on such a straight travel route, tilling travel (straight travel with tilling: exemplary contents of a work event (a work action)) is executed by lowering the tilling device 22 and non-tilling travel (straight travel without tilling: exemplary contents of a work event) is executed by raising the tilling device 22 to stop tilling work. While the vehicle body 1 is redirected, right turn travel (right turn: exemplary contents of a work event) or left turn travel (left turn: exemplary contents of a work event) as one type of U-turn travel, and switchback travel (a-turn: exemplary contents of a work event) including backward travel are executed with steering control.

FIG. 2 exemplifies work event plan points (work action plan points) (indicated by reference signs S1, S2, . . . in FIG. 2) set along the planned travel route. Work events to be executed at the work event plan points (indicated by reference signs E1, E2, in FIG. 2) and on-map positions (indicated by reference signs P1, P2, . . . in FIG. 2) are allocated to the work event plan points. Each of the work events includes, as work event attribute values, parameters (indicated by reference signs e11, e12, . . . in FIG. 2) determining actuation states of the vehicle body 1 (e.g. vehicle speed, a variable speed level, and a steering angle) and actuation states of the tilling device 22 (e.g. a tilling depth and a raised position). A specific one of the work events is executed in accordance with the parameters. The on-map positions are indicated by coordinate positions (indicated by (x1, y1), (x2, y2), . . . in FIG. 2). The work events are provided, as the attribute values, with phrases simply expressing the contents of the work events such as "left turn", "right turn", and "straight travel with tilling".

Figure 3:
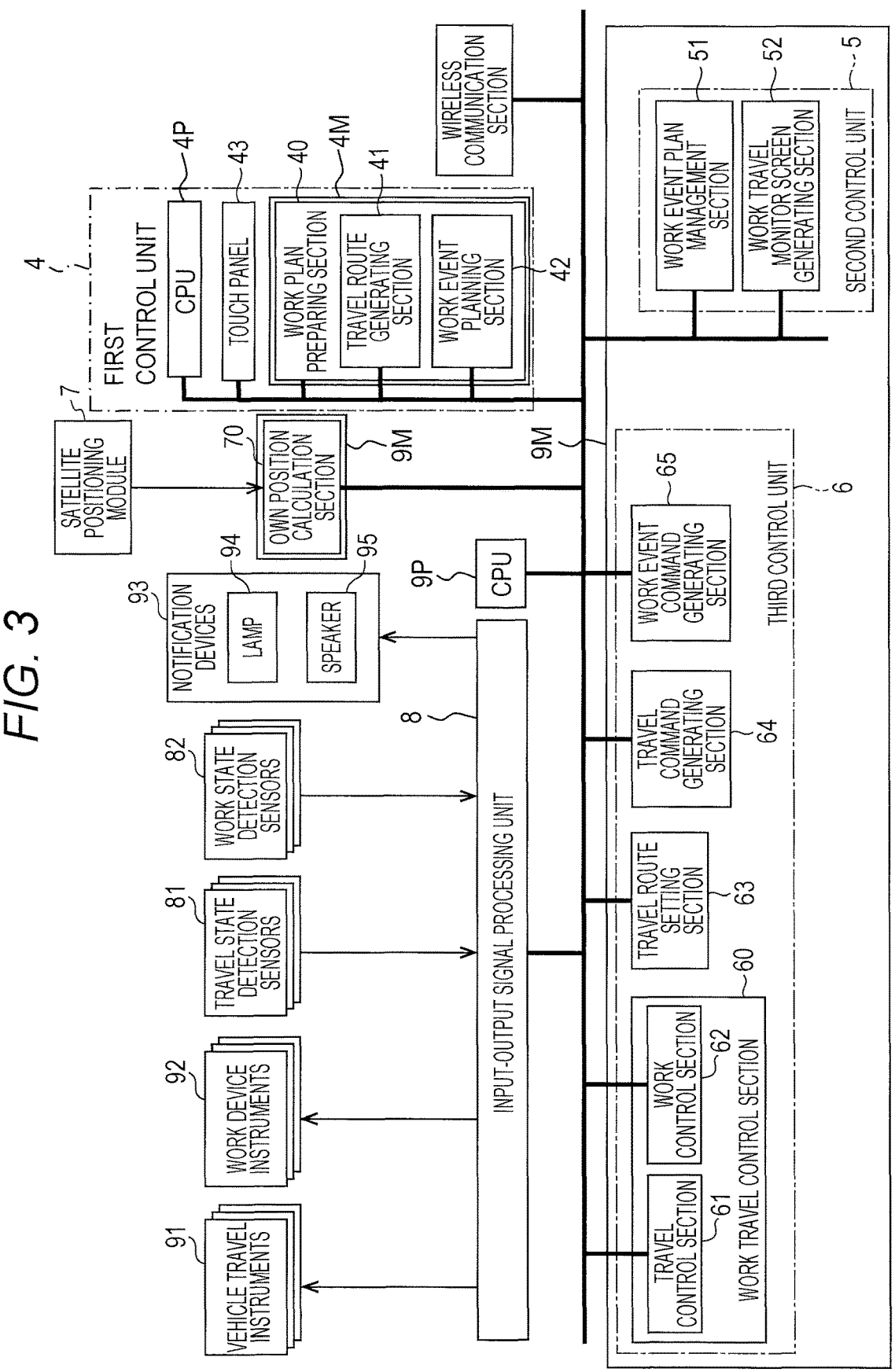
FIG. 3 illustrates a structure of the automatic travelling work vehicle according to the embodiment of the present invention.
Figure 4:
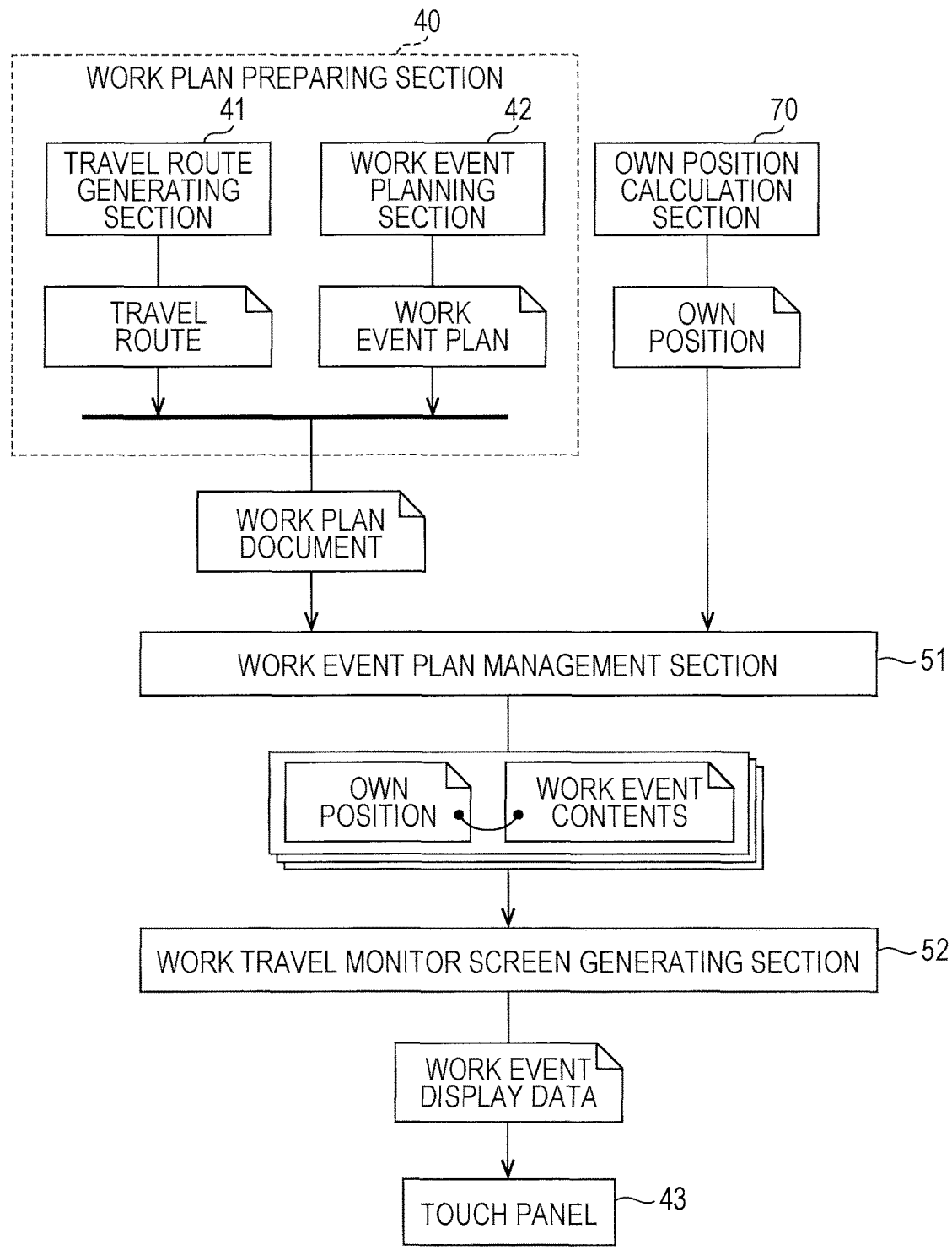
FIG. 4 is an explanatory view of a flow of generating a monitor screen displaying an own position on a travel route and a work event to be executed.

FIG. 3 shows a structure for controlling the tractor. According to this diagram, there are provided the first control unit (data processing terminal) 4 and a second control unit 5 as control units relevant to monitor display of the work events during work travel, as well as a third control unit 6 as a basic control unit configured to control the work travel of the tractor. Categorization of the control units can be modified appropriately and is not limited to the configuration of FIG. 3. FIG. 4 shows a flow of generating a monitor screen displaying an own position on a travel route and a work event to be executed.

In a control system of FIG. 3, the first control unit 4, the second control unit 5, and the third control unit 6 are connected via data-signal lines (e.g. an on-vehicle LAN or control signal lines) indicated by solid lines so as to enable data exchange. There is provided an input-output signal processing unit 8 functioning as an input-output interface and having an output signal processing function, an input signal processing function, a communication function of exchanging data via a wireless line or a wired line, and the like. The data-signal lines are connected with vehicle travel instruments 91 including actuation instruments to the engine 20, the transmission 3, the steering mechanism, and the like, work device instruments 92 including actuation instruments to the tilling device 22, the lifting mechanism 23, and the like, a notification device 93, and the like. The notification device 93 includes a lamp 94, a speaker 95, as well as a gauge and a beeper. The data-signal lines are also connected with an own position calculation section 70, travel state detection sensors 81, work state detection sensors 82, and the like. The own position calculation section 70 calculates an on-map coordinate position of the vehicle body 1 in accordance with positioning data transmitted from a satellite positioning module 7 having a GPS or the like. Specifically, the vehicle body 1 includes a central processing unit (CPU) 9P (circuitry 9P) and a memory 9M, which is preferably a non-volatile memory. A program of the own position calculation section 70 is stored in the memory 9M and executed by the CPU 9P to perform a function of the own position calculation section 70.

The first control unit 4 is configured as a data processing terminal. The first control unit 4 includes a work plan preparing section 40 having a function of preparing a plan of work travel of the tractor along a travel route in a field by means of the touch panel 43. In a case where a work plan document is preliminarily prepared, the work plan document can be received entirely or partially through communication or via a recording medium. The work plan preparing section 40 thus includes a travel route generating section 41 and a work event planning section 42. Specifically, the first control unit 4 includes a central processing unit (CPU) 4P (circuitry 4P) and a memory 4M which is preferably a non-volatile memory. A program of the work plan preparing section 40 (the travel route generating section 41 and the work event planning section 42) is stored in the memory 4M and executed by the CPU 4P to perform a function of the work plan preparing section 40 (the travel route generating section 41 and the work event planning section 42). As shown in FIG. 4, the travel route generating section 41 refers to field information including a shape of a field as a work target, and the like, and generates a travel route using a travel route generation program preliminarily installed. The work event planning section 42 generates a work event plan (work action information) prescribing a work event to be executed during work travel along the travel route. FIG. 2 schematically shows an exemplary work event plan.

The second control unit 5 has a control function of notifying, by means of a monitor screen, an observer of an automatic travelling work vehicle, of contents of work events upon automatic travel with execution of the work events sequentially planned along the travel route. The second control unit 5 thus includes a work event plan management section 51 and a work travel monitor screen generating section 52. Specifically, programs of the work event plan management section 51 and the work travel monitor screen generating section 52 are stored in the memory 9M and executed by the CPU 9P to perform functions of the work event plan management section 51 and the work travel monitor screen generating section 52, respectively. As shown in FIG. 4, the work event plan management section 51 receives a work plan document including the travel route generated by the travel route generating section 41 and the work event plan generated by the work event planning section 42, and manages the contents of the work event and the coordinate position of the work event to be executed, at each work event plan point set on the travel route. That is, the travel route and the work event plan (the work action information) are stored in the memory 9M. The work event plan management section 51 compares the own position calculated by the own position calculation section 70 and the coordinate position of each work event plan point, and transmits, to the work travel monitor screen generating section 52, data (the own position and the contents of the work event) necessary for preparation of a work event display screen. The work travel monitor screen generating section 52 receives the data transmitted from the work event plan management section 51, and generates work event display screen data including a name of the work event and the own position on the work route to be notified to an observer at the own position. The touch panel 43 displays a monitor screen according to the work event display screen data.

Figure 5:
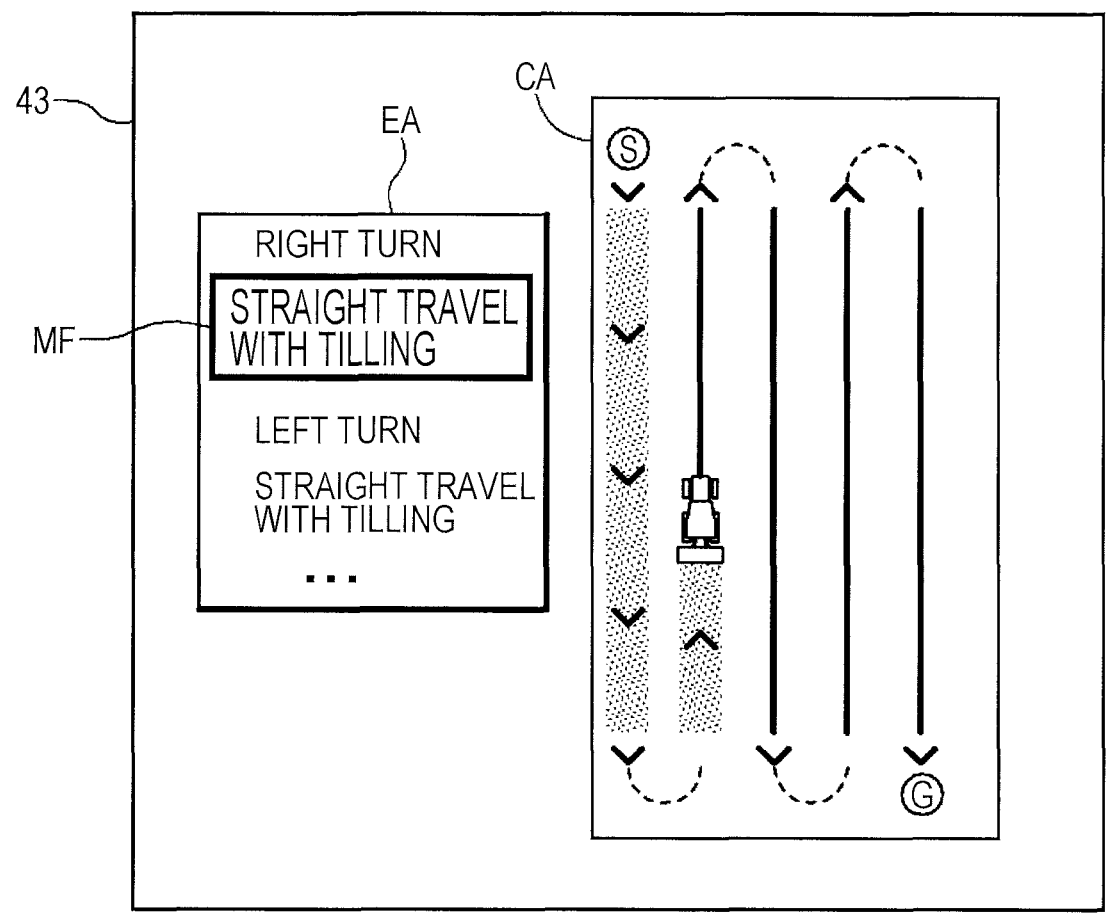
FIG. 5 is an explanatory view of an exemplary monitor screen of solo travel.

FIG. 5 shows an exemplary monitor screen displayed on the touch panel 43 in accordance with the work event display screen data generated by the work travel monitor screen generating section 52. This monitor screen has a left portion provided with a work event contents display area EA chronologically displaying contents of work events, and a right portion provided with a work vehicle position display area CA displaying a travel route and an own position on the travel route. The work event contents display area EA displays phrases expressing the contents of the work events in a scrolling manner chronologically from the top to the bottom. The currently executed work event is provided with a bold frame MF as an identifier distinguishing from the remaining work events. In other words, the work event contents display area EA displays the contents of the currently executed work event as well as the work events executed before and after the current work event (past work events and forthcoming work events). The work vehicle position display area CA schematically displays at least part of the travel route generated by the travel route generating section 41, and displays a symbol indicating the current position of the tractor (icon indicating the tractor) on the travel route. An observer checks such a monitor screen to grasp the contents of the currently executed work event, the contents of the work event to be executed next, and the current position of the tractor on the travel route.

Figure 6:
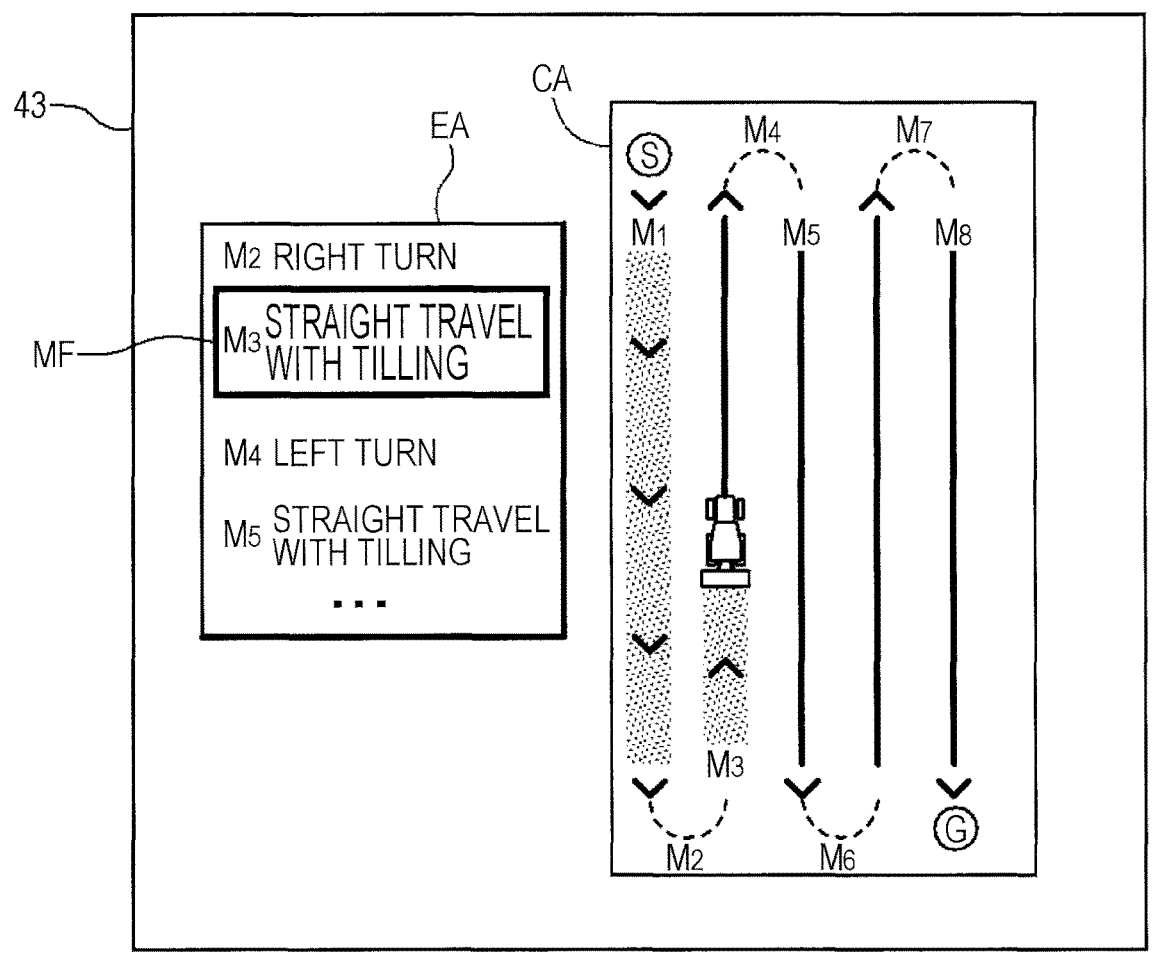
FIG. 6 is an explanatory view of another exemplary monitor screen.

FIG. 6 shows another exemplary monitor screen in a different mode. This screen includes phrases expressing the contents of the work events and symbols specifying the work events (alphabet M followed by a number in FIG. 6). The work vehicle position display area CA thus enables grasp of the contents of the work events prescribed on the travel route. The symbol positioned upstream of the current position of the tractor indicates the work travel already executed, and the symbol positioned downstream of the current position of the tractor indicates the work travel to be executed. This indication enables grasp at a glance of the work events executed during automatic travel along the travel route.

The above embodiment refers to work travel executed by one tractor. The embodiment of the present invention is obviously applicable to a plurality of tractors executing cooperative work travel.

Figure 7:
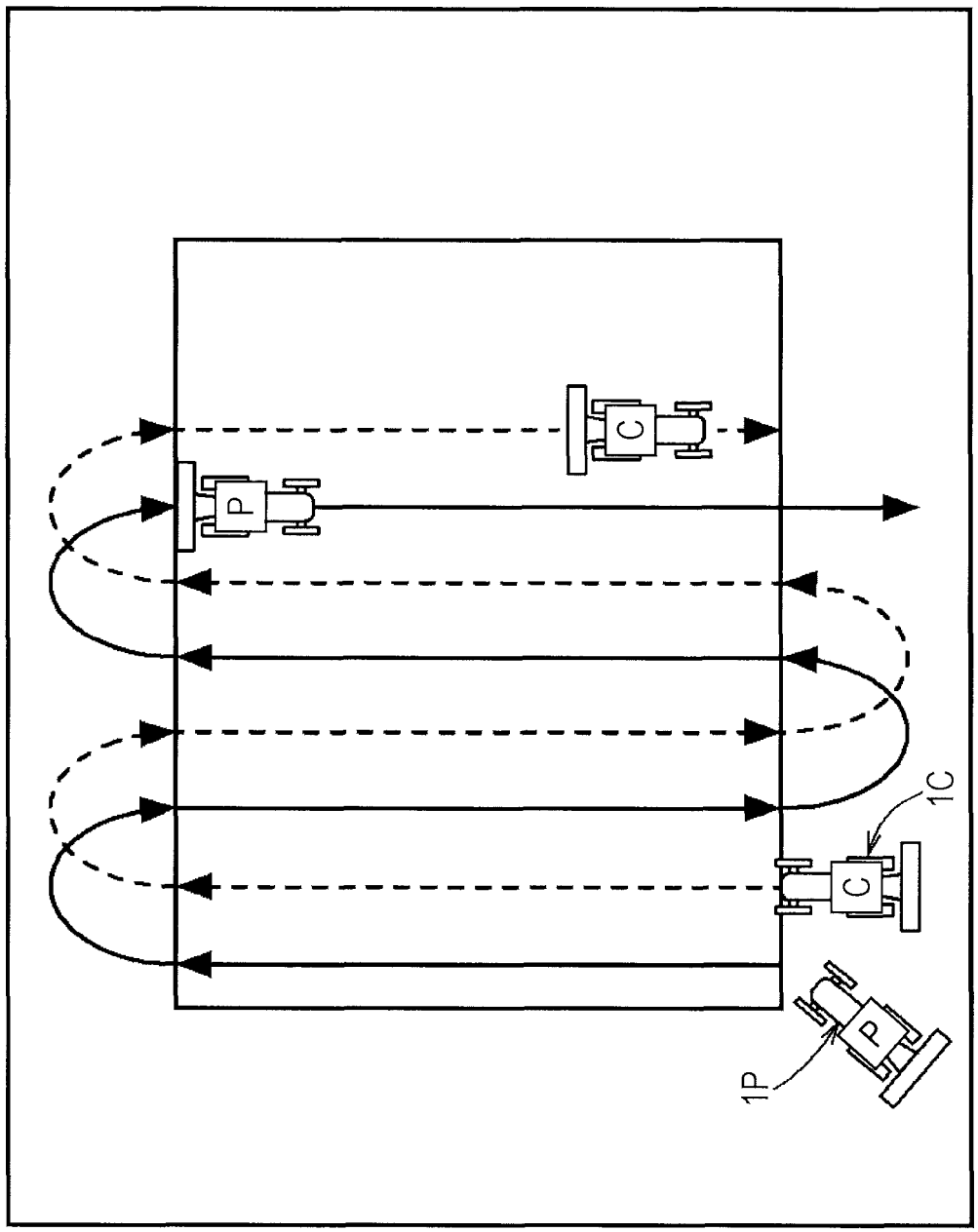
FIG. 7 is an explanatory view of cooperative work travel executed by two automatic travelling work vehicles.

FIG. 7 exemplifies a mode of work travel (automatic travel) executed by two tractors.

The two tractors are herein categorized to a parent tractor 1P (own vehicle) and a child tractor 1C (another vehicle). The parent tractor 1P and the child tractor 1C each include a control system substantially same as the control system shown in FIG. 3. The parent tractor 1P is boarded by an observer who monitors the work travel executed by the parent tractor 1P and the child tractor 1C. The second control unit 5 of the child tractor 1C transfers via a wireless line to the second control unit 5 of the parent tractor 1P, data necessary for generation of work travel monitor image data, an own position, a travel route, a work event plan, and the like. The work travel monitor screen generating section 52 of the parent tractor 1P then prepares work travel monitor image data for preparation of such a monitor screen shown in FIG. 8. The monitor screen of FIG. 8 has an upper left portion provided with the work event contents display area EA for the parent tractor 1P, and a lower left portion provided with the work event contents display area EA for the child tractor 1C. The monitor screen has a right portion provided with the work vehicle position display area CA. The work vehicle position display area CA integrally displays the travel route of the parent tractor 1P and the travel route of the child tractor 1C, and the own position of the parent tractor 1P and the own position of the child tractor 1C are indicated on the corresponding travel routes by symbols (icons indicating the tractors). The parent tractor 1P and the child tractor 1C can be easily distinguished from each other by being drawn in different colors in the work event contents display area EA as well as in the work vehicle position display area CA. An observer can thus finely grasp the work events executed during the work travel by the parent tractor 1P and the child tractor 1C by means of such a monitor screen.

The third control unit 6 has a control functional section configured to control automatic work travel. The third control unit 6 thus includes a travel route setting section 63, a travel command generating section 64, a work event command generating section 65, and a work travel control section 60. Specifically, programs of the travel route setting section 63, the travel command generating section 64, the work event command generating section 65, and the work travel control section 60 are stored in the memory 9M and executed by the CPU 9P to perform functions of the travel route setting section 63, the travel command generating section 64, the work event command generating section 65, and the work travel control section 60, respectively. The travel route setting section 63 develops into a readable state, in the memory 9M, the travel route generated by the travel route generating section 41 as an automatic travel target route. The travel command generating section 64 obtains a displacement amount between the own position transmitted from the own position calculation section 70 and the travel route, and generates a travel command (including a steering command and a vehicle speed command) to reduce the displacement amount. The work event command generating section 65 generates a work event command in accordance with the travel route, the work event plan, and the own position.

The work travel control section 60 includes a travel control section 61 and a work control section 62. The travel control section 61 has an automatic travel control function and a manual travel control function. When the automatic travel control function is selected, the travel control section 61 transmits a control signal to the vehicle travel instruments 91 in accordance with the travel command from the travel command generating section 64. The work control section 62 transmits control signals to the work device instruments 92 in accordance with the work event command. When the manual travel control function is selected, manual travel is executed in accordance with operation of the steering wheel 11 by a driver. The work control section 62 also has an automatic work control function of automatically actuating the work device instruments 92 such as the tilling device 22 and the lifting mechanism 23 in accordance with the work event command, and a manual work control function of manually controlling the work device instruments 92 by means of the various operation tools.

Figure 8:
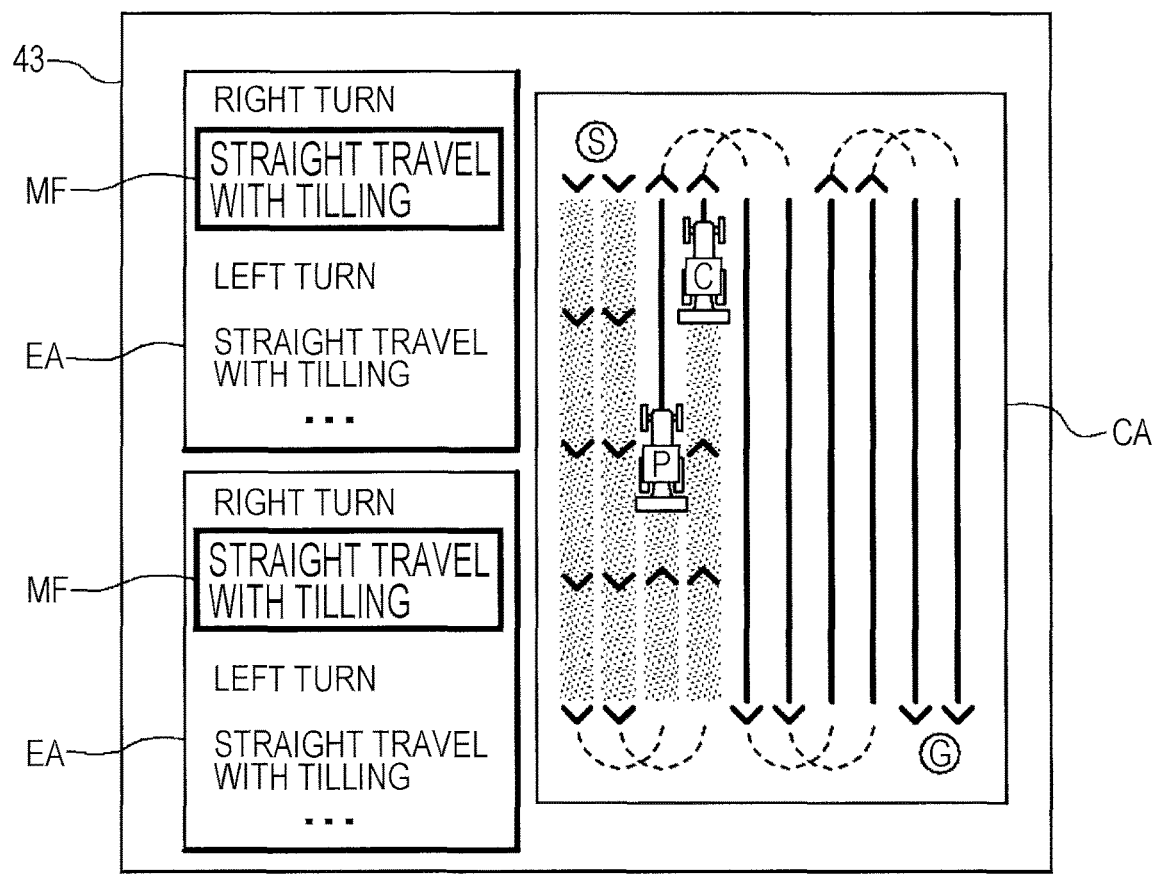
FIG. 8 is an explanatory view of another exemplary monitor screen for cooperative work travel executed by two automatic travelling work vehicles.

The monitor screens shown in FIGS. 5, 6, and 8 each display, in the work event contents display area EA, the contents of the currently executed work event as well as the work events executed before and after the current work event (past work events and forthcoming work events) flowing from the top to the bottom. These figures show exemplary display, and the work event contents display area EA can alternatively display the contents of the currently executed work event, and only at least one of the work events to be executed after the current work event (the contents of the forthcoming work event). The work event contents display area EA can still alternatively display the contents of the currently executed work event and only at least one of the work events executed before the current work event (the contents of the past work event), or display only the contents of the currently executed work event. These various display patterns can be made appropriately selectable.

OTHER EMBODIMENTS (1) The above embodiment exemplifies the touch panel 43 configured to chronologically display the contents of the work events. The touch panel 43 can be replaced with a display unit or the like provided as the notification device 93.

(2) The above embodiment exemplifies the tractor equipped with the tilling device 22 as a work vehicle. The embodiment of the present invention is also applicable to a tractor equipped with a work device other than the tilling device 22, as well as to an agricultural work machine such as a combine harvester or a rice transplanter, and to a construction machine.

(3) The tractor according to the above embodiment includes the first control unit 4, the second control unit 5, and the third control unit 6 connected via the on-vehicle LAN. The first control unit 4 functioning as a data processing terminal can alternatively be configured as a tablet computer, a notebook computer, a smartphone, or the like, which is carried by a manager and wirelessly exchanges data with the control system of the tractor. The first control unit 4 can still alternatively be disposed at a distant place such as a management center or a user's residence, and be configured as a computer connected with the control system of the tractor via the Internet or the like.

(4) The diagram of FIG. 3 exemplifies the units categorized for easier description. These units can be modified appropriately by integrating some of the units or dividing a single unit into a plurality of units.

INDUSTRIAL APPLICABILITY

The present invention is applicable to an automatic travelling work vehicle configured to execute work travel along a travel route.

An automatic travelling work vehicle according to the embodiment of the present invention is configured to automatically travel along a travel route. The automatic travelling work vehicle includes: an own position calculation section configured to calculate an own position in accordance with positioning data transmitted from a satellite positioning module; a travel route generating section configured to generate the travel route; a work event planning section configured to generate a work event plan prescribing a work event executed during work travel along the travel route; a work event command generating section configured to generate a work event command in accordance with the travel route, the work event plan, and the own position; a work travel control section configured to control execution of automatic travel along the travel route and the work event according to the work event command; and a work travel monitor screen generating section configured to generate work event display screen data for chronologically displaying a content of the work event executed during the work travel in a monitor.

In this configuration, the work events to be executed near the own position are extracted from the work event plan, so that the contents of the extracted work events are displayed sequentially on the screen of a display unit (possibly a touch panel). The work events to be executed sequentially can thus be grasped by checking the contents of the work events displayed on the screen. Examples of the contents of the work events include straight travel with work, straight travel without work, right turn, left turn, and temporary stop. Each of the work events can further be provided with a work travel parameter determining work travel of the work vehicle such as vehicle speed, a turn angle, or a turn radius, as an event attribute value for achievement of the work event.

According to an embodiment of the present invention, the work event display screen data includes a content of the work event prescribed at a current own position on the travel route and a content of the work event executed after the current work event, and the content of the currently executed work event is provided with an identifier. This configuration enables monitor display of the contents of the work event executed at the current own position as well as the contents of the work event to be executed after the current work event, in other words, the contents of the work event to be executed later. A user can thus continuously grasp, on this monitor screen, the contents of the work events executed from the current point to a future point during the work travel along a work route, to continuously grasp the work travel.

According to an embodiment of the present invention, the work event display screen data includes a content of the work event prescribed at a current own position on the travel route, a content of the work event executed before the current work event, and a content of the work event executed after the current work event, and the content of the currently executed work event is provided with an identifier. This configuration enables simultaneous monitor display of the contents of the work event executed at the current own position as well as the contents of the work event executed before the current work event, in other words, the contents of the past work event, and the contents of the work event to be executed after the current work event, in other words, the contents of the forthcoming work event. A user can thus continuously grasp, on this monitor screen, the contents of the work events in a series of work travel along the work route.

Furthermore, according to an embodiment of the present invention, the work event display screen data includes the travel route, and a symbol indicating a current own position on the travel route. This configuration enables monitor display of the travel route as a target in the automatic travel as well as indication of the current own position on the travel route by means of the symbol. The monitor screen enables grasp of the contents of the currently executed work event during the work travel as well as the current own position on the travel route to finely monitor the automatic work travel.

Furthermore, according to an embodiment of the present invention, the work event display screen data includes a symbol located on the travel route and indicating the work event prescribed at each position on the travel route. This configuration achieves indication, by means of the specific symbols on the travel route, of all the work events executed on the travel route during the work travel along the travel route, to enable grasp, on the monitor screen, of the positions on the travel route of the executed work events.

A work field can be cooperatively processed by a plurality of automatic travelling work vehicles, instead of a single automatic travelling work vehicle. Before the plurality of automatic travelling work vehicles executes cooperative work travel, there are generated travel routes for the work travel of the plurality of automatic travelling work vehicles, and a work event plan document prescribing work events to be executed by the automatic travelling work vehicles on the travel routes. In the cooperative work travel, an observer boarding one of the automatic travelling work vehicles monitors the own work travel as well as the work travel of the remaining automatic travelling work vehicles (other vehicles). Alternatively, an observer positioned to be able to monitor the work travel of all the vehicles monitors the work travel of all the vehicles by means of a monitor screen of a communication terminal (such as a tablet computer or a smartphone) having the monitor display function carried by the observer. In order to apply the embodiment of the present invention to such cooperative work travel, according to an embodiment of the present invention, the work travel monitor screen generating section further has a function of generating work event display screen data for another automatic travelling work vehicle cooperatively executing the work travel, and the monitor screen integrally displays a monitor image of the own vehicle according to the work event display screen data of the own vehicle and a monitor image of the other automatic travelling work vehicle according to the work event display screen data of the other vehicle. An observer can thus grasp, by means of the monitor screen, the work events executed by the respective automatic travelling work vehicles.

Obviously, numerous modifications and variations of the present invention are possible in light of the above teachings. It is therefore to be understood that within the scope of the appended claims, the invention may be practiced otherwise than as specifically described herein.

What is claimed is:

1. A work vehicle comprising:
   a memory to store a travel route and work action information based on which the work vehicle is to execute at least one work action while the work vehicle travels based on the travel route; and
   circuitry configured to
      calculate a position of the work vehicle based on positioning data transmitted from a satellite positioning module,
      control the work vehicle to execute the at least one work action based on the work action information in accordance with the position of the work vehicle while the work vehicle travels based on the travel route stored in the memory, and
      generate screen data to chronologically display the at least one work action in a monitor,
   wherein the screen data includes the travel route and a current position of the work vehicle,
   wherein in the monitor, a symbol indicating the current position of the work vehicle on the travel route is displayed, and
   wherein in the monitor, an additional symbol is displayed along the travel route, the additional symbol indicating a work action corresponding to a position in the travel route along which the symbol is displayed.

2. The work vehicle according to claim 1, wherein the circuitry is further configured to generate the travel route.

3. The work vehicle according to claim 1, wherein the circuitry is further configured to generate the work action plan.

4. The work vehicle according to claim 1, wherein the work action information defines where the work vehicle is to execute the at least one work action while the work vehicle travels based on the travel route.

5. The work vehicle according to claim 1, further comprising:
   the monitor to display the at least one work action based on the screen data.

6. A work vehicle comprising:
   a memory to store a travel route and work action information based on which the work vehicle is to execute at least one work action while the work vehicle travels based on the travel route; and
   circuitry configured to
      calculate a position of the work vehicle based on positioning data transmitted from a satellite positioning module,
      control the work vehicle to execute the at least one work action based on the work action information in accordance with the position of the work vehicle while the work vehicle travels based on the travel route stored in the memory, and
      generate screen data to chronologically display the at least one work action in a monitor,
   wherein the screen data includes a current work action corresponding to a current position of the work vehicle on the travel route among the at least one work action and a prospective work action to be executed after the current work action, and
   wherein in the monitor, the current work action is displayed with an identifier.

7. The work vehicle according to claim 6,
wherein the screen data further includes a past work action executed before the current work action.

8. A work vehicle comprising:
a memory to store a travel route and work action information based on which the work vehicle is to execute at least one work action while the work vehicle travels based on the travel route; and
circuitry configured to
calculate a position of the work vehicle based on positioning data transmitted from a satellite positioning module,
control the work vehicle to execute the at least one work action based on the work action information in accordance with the position of the work vehicle while the work vehicle travels based on the travel route stored in the memory,
generate screen data to chronologically display the at least one work action in a monitor,
wherein the circuitry generates additional screen data for another work vehicle to cooperatively work and travel automatically, and
wherein the work vehicle and the another work vehicle are integrally displayed in the monitor.

9. A method for controlling a work vehicle, comprising:
calculating a position of the work vehicle based on positioning data transmitted from a satellite positioning module;
controlling the work vehicle to execute at least one work action based on work action information in accordance with the position of the work vehicle while the work vehicle travels based on a travel route, the work action information and the travel route being stored in a memory; and
generating screen data to chronologically display the at least one work action in a monitor,
wherein the screen data includes the travel route and a current position of the work vehicle,
wherein in the monitor, a symbol indicating the current position of the work vehicle on the travel route is displayed, and
wherein in the monitor, an additional symbol is displayed along the travel route, the additional symbol indicating a work action corresponding to a position in the travel route along which the symbol is displayed.

10. A method for controlling a work vehicle, comprising:
calculating a position of the work vehicle based on positioning data transmitted from a satellite positioning module;
controlling the work vehicle to execute at least one work action based on work action information in accordance with the position of the work vehicle while the work vehicle travels based on a travel route, the work action information and the travel route being stored in a memory; and
generating screen data to chronologically display at least one work action in a monitor,
wherein the screen data includes a current work action corresponding to a current position of the work vehicle on the travel route among the at least one work action and a prospective work action to be executed after the current work action, and
wherein in the monitor, the current work action is displayed with an identifier.

11. A method for controlling a work vehicle, comprising:
calculating a position of the work vehicle based on positioning data transmitted from a satellite positioning module;
controlling the work vehicle to execute at least one work action based on work action information in accordance with the position of the work vehicle while the work vehicle travels based on a travel route, the work action information and the travel route being stored in a memory;
generating screen data to chronologically display the at least one work action in a monitor,
wherein the circuitry generates additional screen data for another work vehicle to cooperatively work and travel automatically, and
wherein the work vehicle and the another work vehicle are integrally displayed in the monitor.

* * * * *